(12) United States Patent
McCarley

(10) Patent No.: US 6,349,276 B1
(45) Date of Patent: Feb. 19, 2002

(54) MULTILINGUAL INFORMATION RETRIEVAL WITH A TRANSFER CORPUS

(75) Inventor: Jeffrey Scott McCarley, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/181,962

(22) Filed: Oct. 29, 1998

(51) Int. Cl.$^7$ .......................... G06F 17/20; G06F 17/28
(52) U.S. Cl. ............................... 704/8; 704/7; 707/536
(58) Field of Search ............................ 707/530, 536, 707/102, 2–5; 704/2–8, 277; 379/88.05, 88.06

(56) References Cited

U.S. PATENT DOCUMENTS

| | | | | |
|---|---|---|---|---|
| 5,541,837 A | * | 7/1996 | Fushimoto et al. | ............. 704/2 |
| 5,742,505 A | * | 4/1998 | Fushimoto et al. | ............. 704/2 |
| 5,956,740 A | * | 9/1999 | Nosohara | .................... 707/536 |
| 6,006,221 A | * | 12/1999 | Liddy et al. | .................... 707/5 |
| 6,064,951 A | * | 5/2000 | Park et al. | ....................... 704/8 |
| 6,092,034 A | * | 7/2000 | McCarley et al. | ............. 704/2 |

OTHER PUBLICATIONS

Brown et al., "The Mathematics of Statistical Machine Translation: Parameter estimation", Computational Linguistics, 19 (2), 263–311, Jun. 1993.

Brown et al., "Aligning Sentences in parallel Corpora" in Proceedings, 29$^{th}$ Annual Meeting of the Association for Computational Linguistics, Berkeley, CA, Jun. 1991, 169–176.

Robertson et al., "Some Simple Effective Approximations to the 2–Poisson Model for Probabilistic Weighted Retrieval" in Proceedings of the 17 International Conference on Research and Development in Information Retrieval ed. By W.B. Croft and C.J. van Rijsbergen (1994).

Dumais et al., "Automatic Cross–Language Retrieval Using latent Semantic Indexing" in AAAI Symposium on Cross –Language Text and Speech Retrieval, American Association for Artificial Intelligence (1997).

Carbonell et al., "Translingual Information Retrieval: A Comparative Evaluation" in Proceedings of the Fifteenth International Joint Conference on Artificial Intelligence (1997).

D.W. Oard, "Alternative Approaches for Cross–Language Text Retrieval" in AAI Spring Symposium on Cross Language Text and Speech Retrieval (1997).

Oard et al., "A Survey on Multilingual Text Retrieval," UMIACS–TR–96–19, CS–TR–3615, Apr. 1996, pp. 1–31.

* cited by examiner

*Primary Examiner*—Patrick N. Edouard
(74) *Attorney, Agent, or Firm*—F. Chau & Associates, LLP

(57) ABSTRACT

A method for retrieving information, in accordance with the present invention, includes the steps of providing an initial query in a first language, retrieving data in a second language in accordance with the initial query, formulating the query in the second language, retrieving data in a third language in accordance with the query formulated in the second language and outputting data retrieved in the third language in accordance with the initial query. A system is also provided in accordance with the invention.

29 Claims, 6 Drawing Sheets

MULTILINGUAL INFORMATION RETRIEVAL WITH A TRANSFER CORPUS

GOVERNMENTAL INFORMATION

The U.S. Government has a paid-up license in this invention and the right in limited circumstances to require the patent owner to license others on reasonable terms of contract 70NANB5H1174 awarded by National Institute of Standards and Technology (NIST).

BACKGROUND OF THE INVENTION

1. Field of the Invention

The present invention relates to information retrieval and, more particularly, to a system and method for information retrieval systems employing a transfer corpus to retrieve information based on a query and information in different languages.

2. Description of the Related Art

Systems for retrieving documents given a query in the same language as the documents are widely available, for example web search engines. A commonly used scheme is based on the Okapi formula described in S. E. Robertson et. al., "Some Simple Effective Approximations to the 2-Poisson Model for Probabilistic Weighted Retrieval" in Proceedings of the 17th International Conference on Research and Development in Information Retrieval ed. by W. B. Croft and C. J. van Rijsbergen (1994), incorporated herein by reference, which counts the number of words the query and the document have in common and weights the counts by a measure of the rarity of the word. This method is language independent (the query and document can be in any language, as long as it is the same) although simple language-specific linguistic preprocessing steps (e.g. morphological analysis to find root words) improves the performance. This type of linguistic preprocessing is available for many languages.

Several methods for retrieving documents in a language A, given a query in a language B (different from A) "crosslanguage information retrieval (CLIR)" have been described. The two most common techniques are document-translation CLIR and query-translation CLIR. These methods and others have been extensively reviewed as described for document-translation CLIR in D. W. Oard, "Alternative Approaches for Cross-Language Text Retrieval" in AAAI Spring Symposium on Cross Language Text and Speech Retrieval (1997) and J. G. Carbonell et. al.,"Translingual Information Retrieval: A Comparative Evaluation" in Proceedings of the Fifteenth International Joint Conference on Artificial Intelligence (1997), both incorporated herein by reference. The system described in theses references was based on document-translation CLIR: with a machine translation system, the documents were translated from language A to language B. The translated documents are then indexed by an informational retrieval (IR) system operating in language B, the query language. A query entered into the IR system retrieves a translated document. Of course, locating the original untranslated document is trivial because the original documents and their translations are in one-to-one correspondence.

Another widely used method is query-translation CLIR, in which the queries are translated into language A, and then an IR system operating in language B uses the translated queries to retrieve the documents. Other methods have also been described which, for example, invoke use a parallel corpus of pairs of documents which are known to be translations of each other, for example, as described in S. T. Dumais et. al., "Automatic Cross-Language Retrieval Using Latent Semantic Indexing" in AAAI Symposium on Cross-Language Text and Speech Retrieval, American Association for Artificial Intelligence (1997), incorporated herein by reference, but which do not involve any translation of the documents in the corpus that is being retrieved from.

Therefore, a need exists for a multilingual retrieval information retrieval system in which both queries and documents may be in many different languages. A further need exists for an information retrieval (IR) system which combines pairs of languages to retrieve information between a third pair of languages.

SUMMARY OF THE INVENTION

A method for retrieving information, in accordance with the present invention, includes the steps of providing an initial query in a first language, retrieving data in a second language in accordance with the initial query, formulating the query in the second language, retrieving data in a third language in accordance with the query formulated in the second language and outputting data retrieved in the third language in accordance with the initial query.

In alternate methods, the data may be included in documents and the steps of retrieving data in the second and third languages may include the step of retrieving documents and ordering the documents in a decreasing order of relevance of the documents. The initial query may be preprocessed by performing at least one of tokenization, part-of-speech tagging, morphological analysis and stop-word removal. The data may be retrieved from at least one corpus and the method may further include the step of preprocessing data retrieved from the corpus by performing at least one of tokenization, name detection and morphological analysis. The method may further include the step of translating the data from the corpus in accordance with a language of the query. The method may further include the step of indexing the translated data by constructing an inverted index which lists documents in the corpus including elements of the query.

The step of formulating the query may include the step of formulating the query based on contents of the retrieved data. The method may further include a plurality of corpora each corpus having a different language associated therewith, each corpus including documents, the method may further include the steps of retrieving data from each corpus in accordance with a query formulated in a language of a previous corpus, formulating queries in the language of the corpus and retrieving data from a next corpus in accordance with the query formulated in the previous corpus. The method may further include the step of providing an initial query in at least one of a plurality of languages to retrieve documents in the third language. The method may further include the steps of providing corpora in a multiplicity of languages different from the first language and retrieving documents in the multiplicity of languages from the corpora in accordance with the initial query.

Another method for retrieving information based on a query includes the steps of providing an initial query in a first language, providing at least two corpora of information including textual representation of documents, each of the at least two corpora having a different language associated therewith other than the first language, retrieving documents from a transfer corpus of the at least two corpora to provide documents in the language of the transfer corpus in accordance with the initial query, formulating a revised query in the language of the transfer corpus based on the documents retrieved from the transfer corpus and retrieving documents from a target corpus of the at least two corpora to provide documents in the language of the target corpus in accordance with the revised query such that the documents retrieved from the target corpus are responsive to the initial query.

In other methods, the steps of retrieving documents may include the step of ordering the documents in a decreasing order of relevance of the documents. The initial query may be preprocessed by performing at least one of tokenization, part-of-speech tagging, morphological analysis and stop-word removal. The step of preprocessing documents retrieved from the transfer corpus and the target corpus by performing at least one of tokenization, name detection and morphological analysis may be included. The method may further include the step of translating the documents from the transfer corpus and the target corpus in accordance with a language of the initial query and the revised query, respectively. The method may also include the step of indexing the translated documents by constructing an inverted index which lists the documents which include elements of the initial query and the revised query. The method may further include a plurality of corpora as described herein. The method may further include the step of providing an initial query in at least one of a plurality of languages to retrieve documents in the target language. The method may further include the steps of providing corpora in a multiplicity of languages different from the first language and retrieving documents in the multiplicity of languages from the corpora in accordance with the initial query.

A program storage device readable by machine, tangibly embodying a program of instructions executable by the machine to perform method steps for identifying commands in recognized text, the method steps include providing an initial query in a first language, retrieving data in a second language in accordance with the initial query, formulating the query in the second language, retrieving data in a third language in accordance with the query formulated in the second language and outputting data retrieved in the third language in accordance with the initial query.

In alternate embodiments, the program storage device may include the step retrieving documents and ordering the documents in decreasing order of relevance of the documents. The initial query may be preprocessed by performing at least one of tokenization, part-of-speech tagging, morphological analysis and stop-word removal. The data may be retrieved from at least one corpus and the method may further include the step of preprocessing data retrieved from the corpus by performing at least one of tokenization, name detection and morphological analysis. The program storage device may further include the step of translating the data from the corpus in accordance with a language of the query. The program storage device may further include the step of indexing the translated data by constructing an inverted index which lists documents in the corpus including elements of the query. The program storage device, wherein the step of formulating the query may include the step of formulating the query based on contents of the retrieved data. The program storage device may further include a plurality of corpora each corpus having a different language associated therewith, each corpus including documents, the method may included the steps of retrieving data from each corpus in accordance with a query formulated in a language of a previous corpus, formulating queries in the language of the corpus and retrieving data from a next corpus in accordance with the query formulated in the previous corpus. The method may further include the step of providing an initial query in at least one of a plurality of languages to retrieve documents in the third language. The method may further include the steps of providing corpora in a multiplicity of languages different from the first language and retrieving documents in the multiplicity of languages from the corpora in accordance with the initial query.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
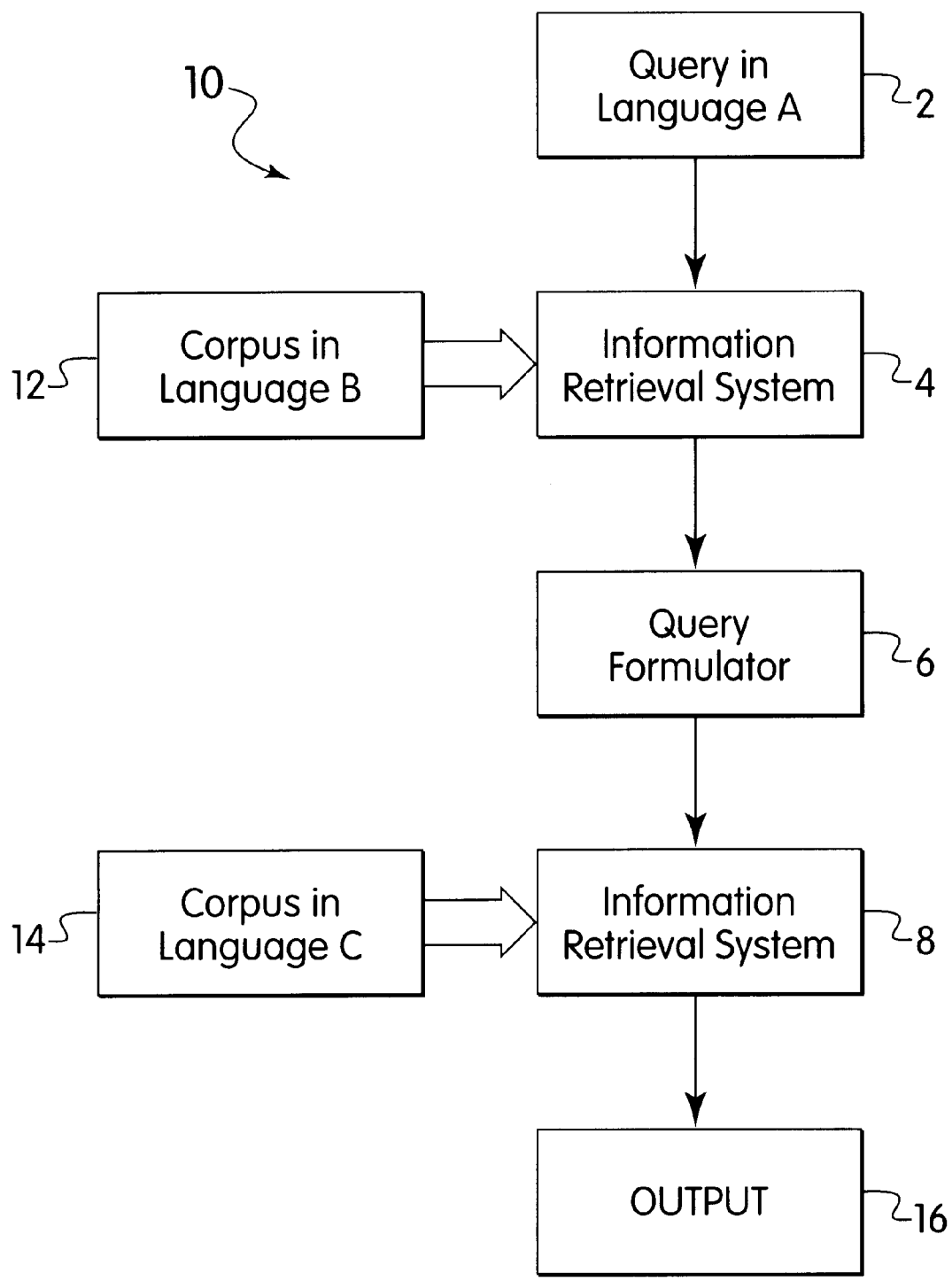
FIG. 1 is a block/flow diagram of a system/method for multilingual information retrieval in accordance with the present invention.

The present invention relates to information retrieval and, more particularly, to a system and method for information retrieval systems employing a transfer corpus to retrieve information based on a query and information in different languages. In a multilingual retrieval information retrieval system in which both queries and documents may be in many different languages, it is unlikely that satisfactory translation resources will exist for all possible language pairs. It is advantageous to be able to combine information retrieval (IR) systems between two pairs of languages to retrieve information between a third pair of languages. To retrieve documents in language A given a query in a different language B, already existing information retrieval resources are combined (1) for retrieving documents in language C given a query in language B, and (2) for retrieving documents in language A given a query in language C by using the query in language B to retrieve documents in language C, and then formulating another query in language C based on the retrieved documents, and using that query to retrieve the sought-after documents in language A.

One problem that the present invention solves arises when an information retrieval system permits queries and documents to be in many different languages. An example based on three languages is used to describe the invention, however the invention may be extended to more than three languages. The invention includes a method of combining two-language information retrieval systems, which are themselves based on one-language information retrieval systems. Two-language and one-language systems are described above.

It should be understood that the elements shown in FIGS. 1–6 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a flow/block diagram is shown of a multilingual information retrieval method/system referred to generally as system 10 in accordance with the present invention. Multilingual information retrieval, in accordance with the present invention includes retrieving documents from a corpus 14 in language C, given queries in language A in block 2. A corpus as referred to herein includes a body of textual information, and may included multiple bodies of textual information. Further the corpora described herein for the present invention may be expanded for all intents and purposes to each include multiple corpora. A language corpus includes a body of textual information (i.e., data) in a given language. System 10 may be constructed without translation resources between languages A and C, by invoking an intermediate language B as a transfer corpus in block 12 for which translation resources between C and B and between A and B are available. A corpus of documents in language B is available from block 12. In a preferred embodiment, corpus 12 of documents in language B preferably cover a similar range of topics as corpus 14 in language C, but these corpora need not be translations of each other. A system 4 for retrieving documents, for example a CLIR system, is constructed from language B corpus 12 given queries in language A form block 2. Then, another system 8 for retrieving documents, for example a CLIR system, from language C corpus 14 is constructed and given queries in language B. To achieve the desired goal of retrieving documents from language C corpus 14 given a query in language A in block 2, system 4 is used to retrieve documents from transfer corpus 12 in language B, given the query in language A. Then a new query in language B is formulated in block 6, and system 8 uses the language B query to retrieve the sought-after documents from language C corpus 14. Results of the query in language A are output in block 16.

Figure 2:
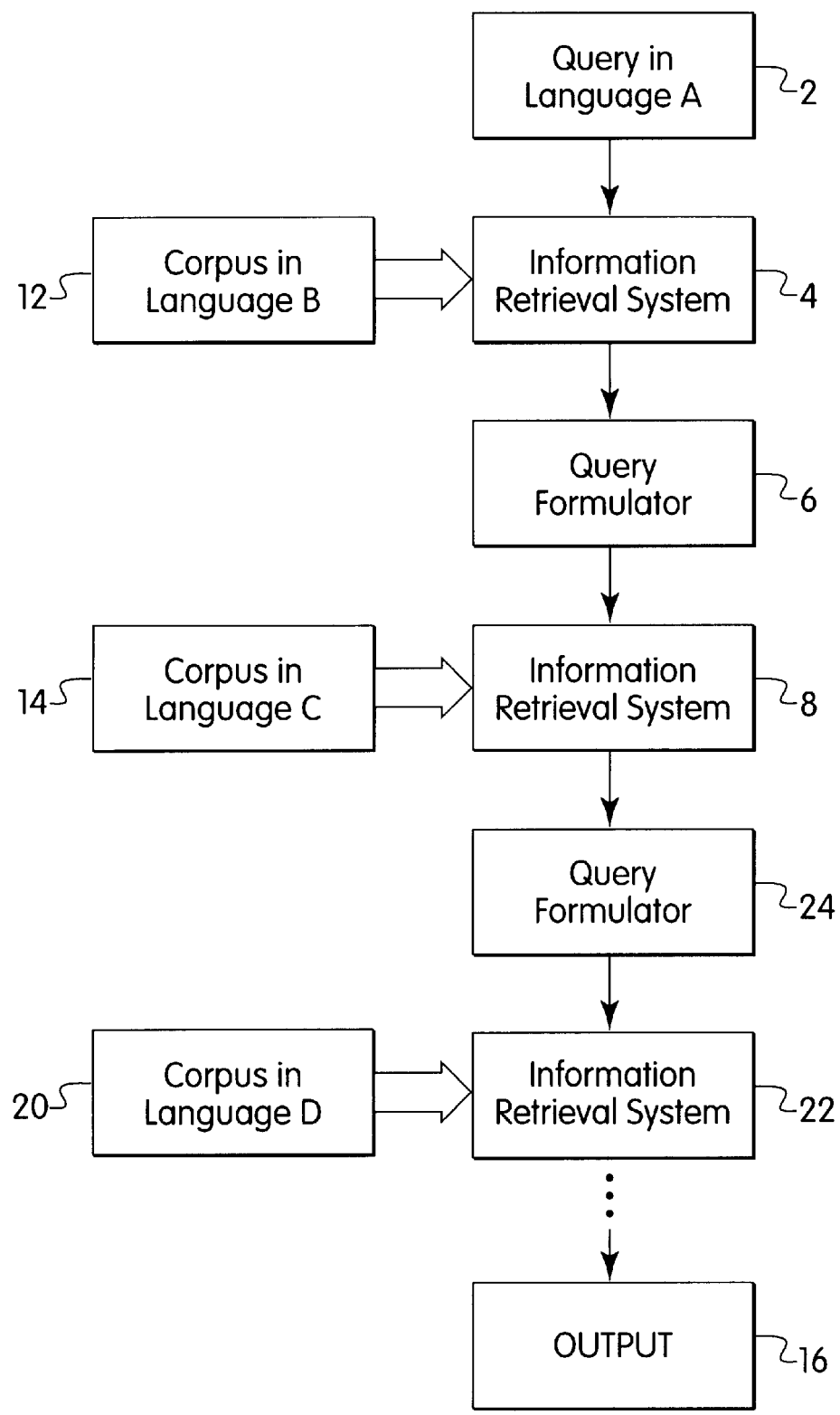
FIG. 2 is a block/flow diagram of a system/method for multilingual information retrieval showing a plurality of language corpora in accordance with the present invention.

Referring now to FIG. 2, additional transfer corpora may be added to provide results to the query in block 2. An additional formulator 24 is included similar to that which is described in block 6 of FIG. 1. An additional corpus 20 for a language D is provided as well as an IR system 22 and an additional formulator 24. More languages may be provided by adding the components described. Additional language corpora may be added to find documents according to the query. For example, if a query in English (language A) is provided for documents in Polish (language D), corpora in intermediate languages may be needed since there may not be adequate resources for translation from Polish to English. For example, the following transfers may need to be performed: German (language B) to Russian (language C) and Russian (language C) to Polish (language D).

Figure 3:
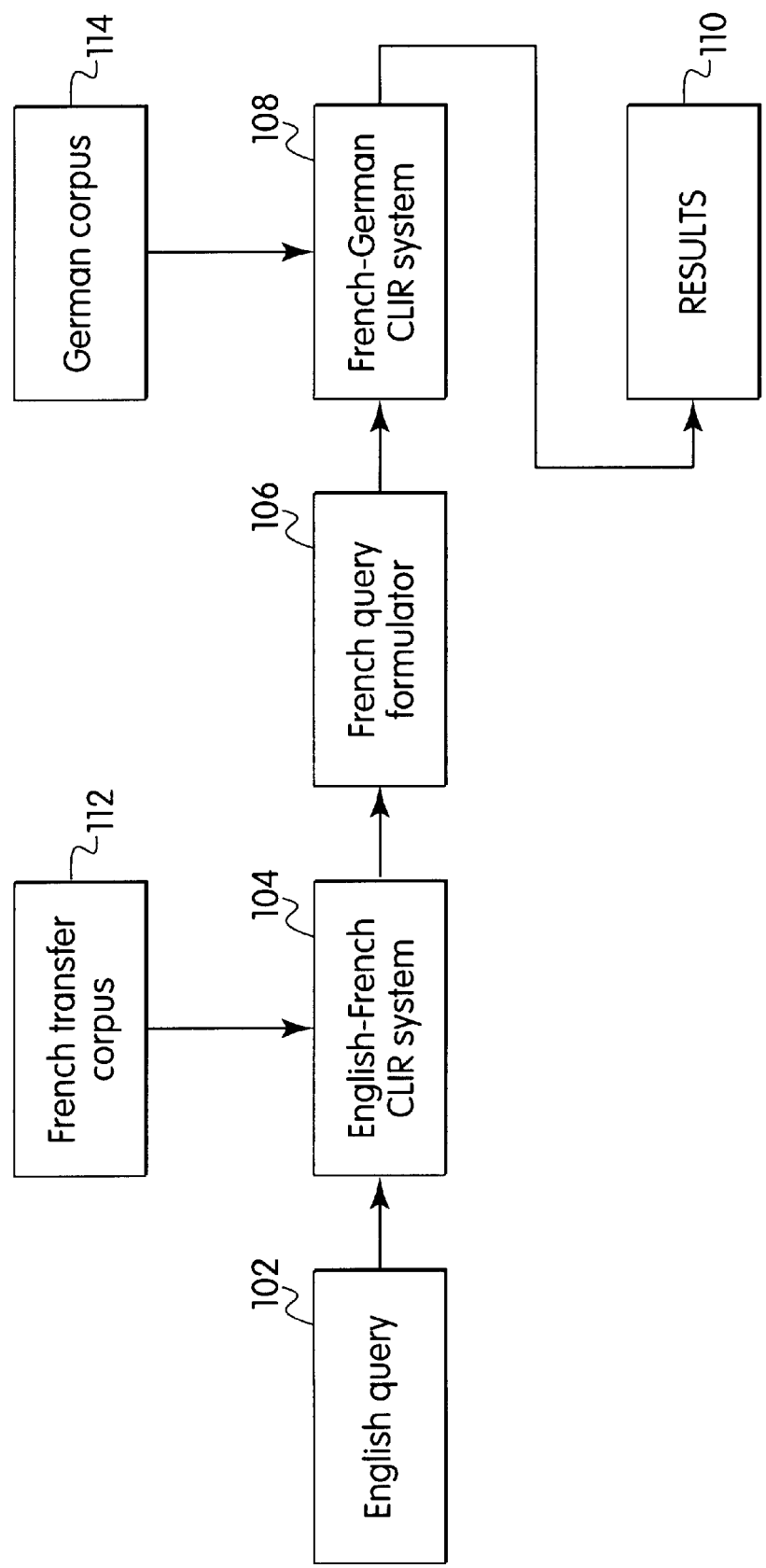
FIG. 3 is a block/flow diagram of one embodiment for a multilingual information retrieval system in accordance with the present invention.

To more clearly define the invention languages A, B and C will be defined and experimental results will be described by way of example according to one embodiment of the present invention. The system to be described below, includes language A as English, language B as French, and language C as German. The invention is, however, not limited to these three languages and may include many languages in addition to those mentioned. Referring now to FIG. 3, the present invention will be described by way of example for one embodiment shown in a block/flow diagram. A composite system 100 include two IR systems 104 and 108, preferably CLIR systems. System 108 retrieves German documents given a French query, and system 104 retrieves French documents given an English query. Systems 104 and 108 may be implemented as document-translation CLIR systems, however, in other implementations of system 100, systems 104 and 108 may include query-translation CLIR systems.

Composite system 100 retrieves documents from a German corpus that are relevant to an English query in block 102. In block 102, the user enters the English query into system 100 to describe an information request. The information request may include one or more words or phrases or may be natural language. In block 104, an English-French CLIR system 104 is included. System 104 retrieves French documents given an English query. Information from a French transfer corpus 112 and the English query from block 102 are input into system 104. System 104 outputs a list of French documents from 112 to be used in later processing, for example, in one embodiment, ranked in decreasing order of probability of relevance (i.e. the first document is most likely to be relevant). The output may also include the text of the original document, or its translation (i.e., the output of block 210 in FIG. 4). In block 106, a French query formulator is provided which takes as input a list of the French documents uncovered as a result of the search of corpus 112, and outputs a query based on the content of those documents which may be used as input to another information retrieval (IR) system in block 108. The query may simply be the raw text of the documents uncovered or the raw text of a predetermined number of the most likely documents, for example the top three most likely documents. In block 108, the IR system includes a German-French CLIR system for retrieving German documents given a French query. The input and output for block 108 is similar to block 104, except for the languages. In block 110, an output of French-German IR system includes a list of German documents from a corpus of German language documents in block 114 in a format useful to the user, for example, ranked in decreasing order of probability of relevance. This output may also include the text of the original document(s).

Block 112 includes what is referred to herein as a transfer corpus or a collection of documents covering a similar range of topics as the corpus from which documents are desired or requested, but not necessarily possessing any other relationship. In FIG. 3, block 112 includes the transfer corpus in accordance with the present invention. The transfer corpus includes a French language for this example, while block 114 includes a German language corpus. The collection of German documents in block 114 are the documents the user desires to retrieve relevant documents from.

Figure 4:
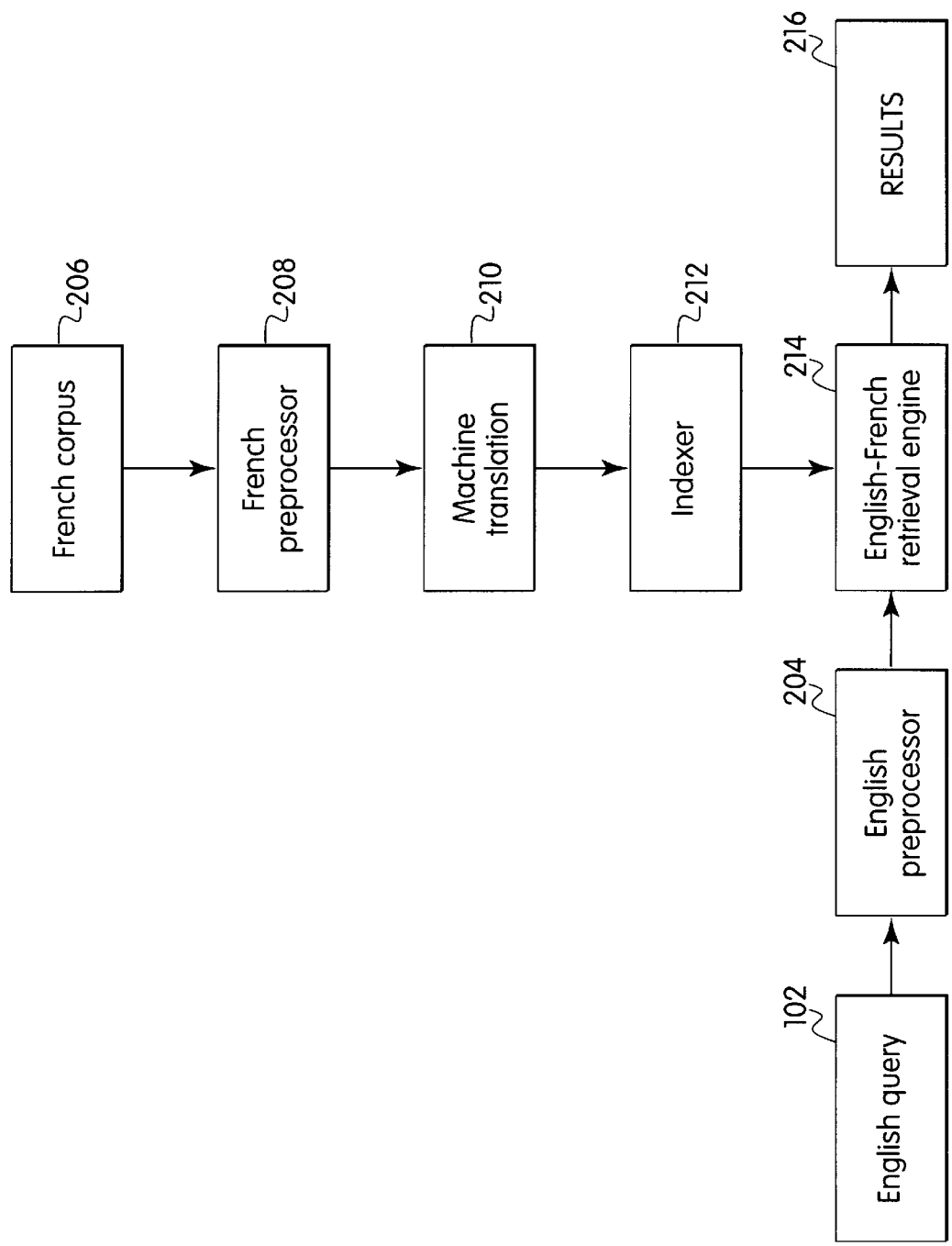
FIG. 4 is a block/flow diagram of a cross language information retrieval system of FIG. 3 in accordance with the present invention.

Referring to FIG. 4, details of block 104, the English-French CLIR system are shown. An English query is input as in block 102. In block 204, an English query preprocessor transforms the query into a standard form for a retrieval engine in block 214. Features of the preprocessor may include tokenization, part-of-speech tagging, morphological analysis and stop-word removal as are known in the art. For example, a stop word is a common word such as "a", "and", or "the" which has no value for information retrieval. Standard lists of stop-words are widely available. Stop-word removal step is optional, but may improve performance. In block 206, a French corpus including a collection of French documents is indexed for retrieval. In block 208, a preprocessor is included for preprocessing French documents, the preprocessor simplifies the language used in the French documents. Features may include tokenization, name detection, and morphological analysis. The features that may be used here are limited by the nature of a machine translation engine in block 210.

In block 210, a machine translation engine translates French text into English text. This may be as simple as a bilingual dictionary lookup, or may take the context of the word into account in a variety of ways, for example as described in P. F. Brown et al. "The mathematics of statistical machine translation: Parameter estimation", Computational Linguistics, 19 (2), 263–311, Jun. 1993, incorporated herein by reference. In block 212, an indexer builds an inverted index on the translated documents output from block 210. An inverted index is a table which, for some or all words or phrases, lists the documents that include that word. Inverted indices are widely used in the IR applications. In block 214, an IR engine is provided and given an inverted index of a corpus of documents and a query produces a list of documents in decreasing order of their probability of relevance. In block 216, results of the retrieval, for example, a list of documents in decreasing order of the probability of relevance is output. The French-German CLIR system in block 108 of FIG. 3 functions similarly to the English-French CLIR system in block 104 of FIG.3 as described above with reference to FIG.4, except English is replaced by French and French is replaced by German. Systems 104 and 108 may be one of document translation and query translation systems, but need not be the same type of system. As outlined above, the languages described herein are illustrative only and may be replaced by any language with an available corpus.

As described above, the present invention may be extended to multiple languages in many ways. Three ways are described below. It is to be understood that the languages described herein are illustrative only and may be interchanged by any language. In a first method, as described above multiple transfer corpora may be implemented.

Figure 5:
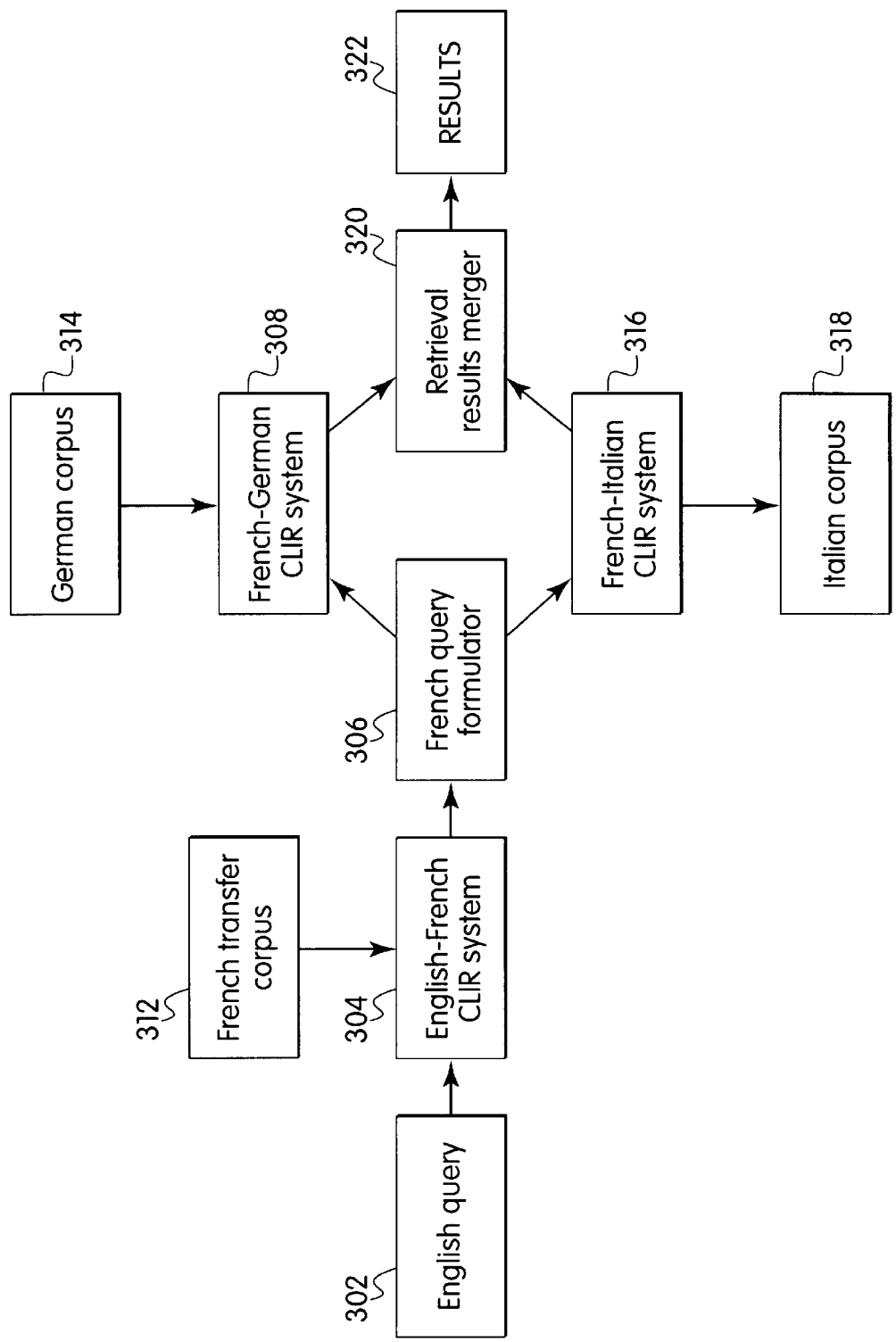
FIG. 5 is a block/flow diagram of another embodiment of the multilingual information retrieval system including multiple document languages in accordance with the present invention.

Referring to FIG. 5, multiple document languages may be used to retrieve documents in multiple languages due to a query in a language different from the document languages. For example, in addition to retrieving German documents, other documents in other languages may be retrieved using the French transfer corpus. In one example, two systems using an English query may share a French transfer corpus and may be retrieve documents in Italian and German. These two systems may be combined to retrieve Italian and German documents at the same time given a single English query as shown in FIG. 5. A system 300 for retrieving documents in multiple languages in accordance with a query is described in terms of English, German, French and Italian languages, however any languages may be substituted in accordance with the invention. System 300 retrieves German and Italian documents from a German corpus 314 and an Italian corpus 318 relevant to an English query in block 302. In block 304, a CLIR system retrieves French documents from French corpus 312 in the same manner as described above. A French query formulator in block 306 passes French queries to blocks 308 and 316 or may customize a query separately form each of blocks 308 and 316. Blocks 308 and 316 include a French-German CLIR system and a French-Italian CLIR system, respectively for retrieving documents in the respective languages. System 300 may be expanded to include a plurality of languages. Once retrieved the results may be merged in a single list of documents likely to be relevant to the query in block 320 and output in block 322.

Figure 6:
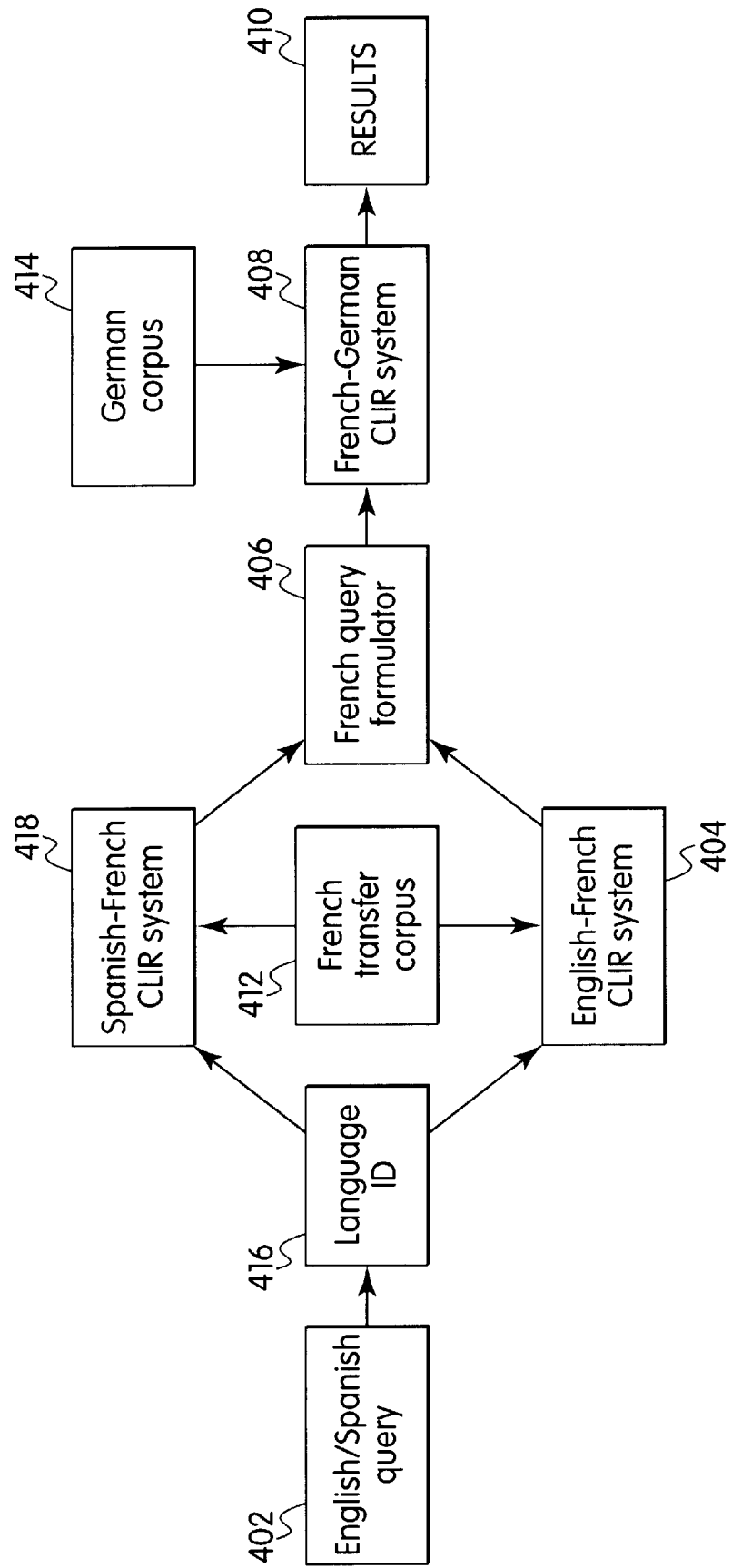
FIG. 6 is a block/flow diagram of yet another embodiment of the multilingual information retrieval system including multiple query languages in accordance with the present invention.

Referring to FIG. 6, multiple query languages may be applied in system 400 too retrieve documents. A system 400 for retrieving documents in multiple languages in accordance with a query is described in terms of English, Spanish, German and French languages, however any languages may be substituted in accordance with invention. Again using a common transfer corpus system 400 may be constructed in accordance with the invention to output German documents from a German corpus 414 given a query in Spanish or English from block 402, using a common transfer corpus such as a French transfer corpus 312.

A query is posed in English, Spanish or a combination of both in block 402. The language of the query is identified in block 416, once determined the path is directed to either a Spanish-French CLIR system in block 418 or to an English-French CLIR system 304 or both (depending on the query). French transfer corpus 412 may be shared by blocks 418 and 404 or each use different corpora. Based on the French documents of the transfer corpus 412, a French query is formulated in block 406. A French-German CLIR system in block 408 retrieves German document form German corpus 414 and outputs the results in block 410.

One advantage to using the transfer corpus in accordance with the present invention becomes apparent when there are many query languages, many document languages and one transfer corpus. For example, if there are five different languages, with queries and documents in all five languages, then 20 different machine translation programs are needed. For example if each letter represents a language then the following machine translation programs are needed, as shown in Table 1.

TABLE 1

| — | E→F | E→G | E→I | E→S |
|---|---|---|---|---|
| F→E | — | F→G | F→I | F→S |
| G→E | G→F | — | G→I | G→S |
| I→E | I→F | I→G | — | I→S |
| S→E | S→F | S→G | S→I | — |

If F is used as a transfer corpus in accordance with the invention, only 8 machine translation programs are needed as shown in Table 2.

TABLE 2

| E→F | G→F | I→F | S→F |
|---|---|---|---|
| F→E | F→G | F→I | F→S |

The advantages of the present invention increase dramatically when a larger number of languages are involved.

Experimental Results:

A collection of about 250000 German documents and 141000 French documents from a Swiss newswire service and a Zurich newspaper were made available by NIST as a result of the TREC conference (See, e.g., The Sixth Text Retrieval conference (TREC-6) ed. by E. M. Voorhees and D. K. Harman. French documents (Swiss newswire) were also made available. The newswire articles were not translations of each other, but since the collections covered the same years, there were many articles describing the same events. A machine translation program was built that translated from French to English. The Hansard collection of Canadian parliamentary proceedings was used as training data. Also built was a German to French translation engine in the form of a dictionary statistically constructed by the methods described in P. F. Brown et al., "The mathematics of statistical machine translation: Parameter estimation". The training data was a set of comparable articles from the TREC collection, which were aligned as is known in the art. The TREC-6 conference also provided a collection of 25 queries in English (and manually translated into French and German) and a set of relevance judgments of articles in the German corpus with respect to these queries.

Experiments were performed to compare the present invention conventional IR systems. The results of the following experiments were compared:

(1) retrieval documents based on German queries in a German corpus(no translation);

(2) retrieval of documents based on French queries of the German corpus translated into French;

(3) retrieval of documents with the English queries of the German documents translated into French and then translated again into English;

(4) retrieval of documents with the English queries of the German documents translated from German into English with a convolution of the German to French and French to English translation engines; and (5) retrieval using the system of the present invention.

Experiment (1) is included principally to illustrate the performance degradation that occurs because of the necessity of machine translation in CLIR. Experiment (2) represents an upper bound to the performance that could be expected from combining two translations (as in experiments 3 and 4) since it was known that the German to French machine translation engine was inferior to the French to English machine translation engine and hence represents a "weak link". Experiments (3) and (4) are the two conventional ways of combining machine translation technology. In the experiments, retrieval via a transfer corpus in accordance with the present invention (Experiment 5) achieves a translation performance of about 67% of a monolingual (one language) IR system (Experiment 1). Experiments 3 and 4 achieved a performance of only 37% and 45%, respectively of the monolingual retrieval system (Experiment 1). The present invention performs comparably to the single translation baseline (Experiment (2) which had a performance of about 68%.

Having described preferred embodiments of a multilingual information retrieval with a transfer corpus (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for retrieving information comprising the steps of:

providing an initial query in a first language;

retrieving data from a transfer corpus in a second language in accordance with the initial query;

formulating the query in the second language;

retrieving data in a third language in accordance with the query formulated in the second language; and outputting data retrieved in the third language in accordance with the initial query.

2. The method as recited in claim 1, wherein the data is included in documents and the steps of retrieving data in the second and third languages include the step of:

retrieving documents and ordering the documents in a decreasing order of relevance of the documents.

3. The method as recited in claim 1, wherein the initial query is preprocessed by performing at least one of tokenization, part-of-speech tagging, morphological analysis and stop-word removal.

4. The method as recited in claim 1, wherein the data is retrieved from at least one corpus and the method further comprises the step of preprocessing data retrieved from the corpus by performing at least one of tokenization, name detection and morphological analysis.

5. The method as recited in claim 4, further comprises the step of translating the data from the corpus in accordance with a language of the query.

6. The method as recited in claim 4, further comprises the step of indexing the translated data by constructing an inverted index which lists documents in the corpus including elements of the query.

7. The method as recited in claim 1, wherein the step of formulating the query includes the step of formulating the query based on contents of the retrieved data.

8. The method as recited in claim 1, further comprises a plurality of corpora each corpus having a different language associated therewith, each corpus including documents, the method further comprising the steps of:

retrieving data from each corpus in accordance with a query formulated in a language of a previous corpus;

formulating queries in the language of the corpus; and retrieving data from a next corpus in accordance with the query formulated in the previous corpus.

9. The method as recited in claim 1, further comprises the step of providing an initial query in at least one of a plurality of languages to retrieve documents in the third language.

10. The method as recited in claim 1, further comprises the steps of:

providing corpora in a multiplicity of languages different from the first language; and retrieving documents in the multiplicity of languages from the corpora in accordance with the initial query.

11. A method for retrieving information based on a query comprising the steps of:

providing an initial query in a first language;

providing at least two corpora of information including textual representations of documents, each of the at least two corpora having a different language associated therewith other than the first language;

retrieving documents from a transfer corpus of the at least two corpora to provide documents in the language of the transfer corpus in accordance with the initial query;

formulating a revised query in the language of the transfer corpus based on the documents retrieved from the transfer corpus; and retrieving documents from a target corpus of the at least two corpora to provide documents in the language of the target corpus in accordance with the revised query such that the documents retrieved from the target corpus are responsive to the initial query.

12. The method as recited in claim 11, wherein the steps of retrieving documents include the step of ordering the documents in a decreasing order of relevance of the documents.

13. The method as recited in claim 11, wherein the initial query is preprocessed by performing at least one of tokenization, part-of-speech tagging, morphological analysis and stop-word removal.

14. The method as recited in claim 11, further comprises the step of preprocessing documents retrieved from the transfer corpus and the target corpus by performing at least one of tokenization, name detection and morphological analysis.

15. The method as recited in claim 14, further comprises the step of translating the documents from the transfer corpus and the target corpus in accordance with a language of the initial query and the revised query, respectively.

16. The method as recited in claim 14, further comprises the step of indexing the translated documents by constructing an inverted index which lists the documents which include elements of the initial query and the revised query.

17. The method as recited in claim 11, further comprises a plurality of corpora each corpus having a different language associated therewith, the method further comprising the steps of:

retrieving documents from each corpus in accordance with a query formulated in a language of a previous corpus;

formulating queries in the language of the corpus; and retrieving data from a next corpus in accordance with the query formulated in the previous corpus.

18. The method as recited in claim 11, further comprises the step of providing an initial query in at least one of a plurality of languages to retrieve documents from the target corpus.

19. The method as recited in claim 11, further comprises the steps of:

providing corpora in a multiplicity of languages different from the first language; and retrieving documents in the multiplicity of languages from the corpora in accordance with the initial query.

20. A program storage device readable by machine, tangibly embodying a program of instructions executable by the machine to perform method steps for identifying commands in recognized text, the method steps comprising:

providing an initial query in a first language;

retrieving data in a second language in accordance with the initial query;

formulating the query in the second language;

retrieving data in a third language in accordance with the query formulated in the second language; and outputting data retrieved in the third language in accordance with the initial query.

21. The program storage device as recited in claim 20, wherein the data is included in documents and the steps of retrieving data in the second and third languages include the step of:

retrieving documents and ordering the documents in decreasing order of relevance of the documents.

22. The program storage device as recited in claim 20, wherein the initial query is preprocessed by performing at least one of tokenization, part-of-speech tagging, morphological analysis and stop-word removal.

23. The program storage device as recited in claim 20, wherein the data is retrieved from at least one corpus and the method further comprises the step of preprocessing data retrieved from the corpus by performing at least one of tokenization, name detection and morphological analysis.

24. The program storage device as recited in claim 23, further comprises the step of translating the data from the corpus in accordance with a language of the query.

25. The program storage device as recited in claim 23, further comprises the step of indexing the translated data by constructing an inverted index which lists documents in the corpus including elements of the query.

26. The program storage device as recited in claim 20, wherein the step of formulating the query includes the step of formulating the query based on contents of the retrieved data.

27. The program storage device as recited in claim 20, further comprises a plurality of corpora each corpus having a different language associated therewith, each corpus including documents, the method further comprising the steps of:

retrieving data from each corpus in accordance with a query formulated in a language of a previous corpus;

formulating queries in the language of the corpus; and retrieving data from a next corpus in accordance with the query formulated in the previous corpus.

28. The program storage device as recited in claim 20, further comprises the step of providing an initial query in at least one of a plurality of languages to retrieve documents in the third language.

29. The program storage device as recited in claim 20, further comprises the steps of:

providing corpora in a multiplicity of languages different from the first language; and retrieving documents in the multiplicity of languages from the corpora in accordance with the initial query.

* * * * *